United States Patent [19]
Barritz et al.

[11] Patent Number: 6,029,145
[45] Date of Patent: *Feb. 22, 2000

[54] SOFTWARE LICENSE VERIFICATION PROCESS AND APPARATUS

[75] Inventors: Robert Barritz; Peter Kasson, both of New York, N.Y.

[73] Assignee: Isogon Corporation, New York, N.Y.

[ * ] Notice: This patent is subject to a terminal disclaimer.

[21] Appl. No.: 08/779,140

[22] Filed: Jan. 6, 1997

[51] Int. Cl.[7] .................................................. G06F 17/60
[52] U.S. Cl. ................................ 705/34; 377/13; 377/15; 377/16; 705/30; 705/400
[58] Field of Search ................................. 377/13, 15, 16; 380/4; 395/184.01; 702/186; 705/1, 30, 34, 400; 714/14

[56] References Cited

U.S. PATENT DOCUMENTS

| | | | |
|---|---|---|---|
| 2,883,255 | 4/1959 | Anderson | 702/187 X |
| 3,351,910 | 11/1967 | Miller et al. | 395/184.01 |
| 3,540,003 | 11/1970 | Murphy | 395/185.01 |
| 3,906,454 | 9/1975 | Lanham | 395/183.21 |
| 4,740,890 | 4/1988 | Tobin | 395/186 |
| 4,821,178 | 4/1989 | Levin | 395/184.01 |
| 4,858,152 | 8/1989 | Estes | 702/186 |
| 4,924,378 | 5/1990 | Hershey et al. | 364/200 |
| 4,937,863 | 6/1990 | Robert et al. | 380/4 |
| 5,204,897 | 4/1993 | Wyman | 380/4 |
| 5,260,999 | 11/1993 | Wyman | 384/4 |
| 5,343,526 | 8/1994 | Lassers | 380/4 |
| 5,386,369 | 1/1995 | Christiano | 705/400 |
| 5,390,297 | 2/1995 | Barber et al. | 395/200 |
| 5,438,508 | 8/1995 | Wyman | 364/401 |
| 5,446,680 | 8/1995 | Sekiya et al. | 395/200.3 |
| 5,446,878 | 8/1995 | Royal | 395/180 |
| 5,475,753 | 12/1995 | Barbará et al. | 380/4 |
| 5,499,340 | 3/1996 | Barritz | 395/184.01 |
| 5,528,753 | 6/1996 | Fortin | 395/183.11 |
| 5,590,056 | 12/1996 | Barritz | 364/550 |
| 5,790,664 | 8/1998 | Coley et al. | 380/4 |
| 5,852,812 | 12/1998 | Reeder | 705/39 |
| 5,898,777 | 4/1999 | Tycksen, Jr. et al. | 380/4 |

*Primary Examiner*—Edward R. Cosimano
*Attorney, Agent, or Firm*—Ostrolenk, Faber, Gerb & Soffen, LLP

[57] ABSTRACT

A method and apparatus for collating, correlating and redistributing information about the use of proprietary products including copyrighted works and licensed software products, at various computer sites. The system consolidates information (originally captured by other systems) by time period, such as day, week or month, about which proprietary products are installed at each computer site, as well as to what particulars of use are relevant. This may include the number of invocations of various software products, the number of logons, the number of concurrent users, as well as other usage metrics. The information is sorted by vendor or copyright owner, so that the information about all of the proprietary products licensed from a particular vendor can be periodically sent to that vendor, automatically, or in response to prompting by vendors or from within the central computer system.

58 Claims, 7 Drawing Sheets

SOFTWARE LICENSE VERIFICATION PROCESS AND APPARATUS

BACKGROUND OF THE INVENTION

The present invention relates to a method and apparatus for monitoring software license compliance and more particularly to a method and apparatus for collating, correlating, and redistributing information about events and conditions pertaining to the installation and use of documents and images generally including licensed computer software products.

This Application is related to Ser. No. 08/531,928, filed Sep. 21, 1995, now U.S. Pat. No. 5,590,056 which is a Continuation of Ser. No. 08/180,218 filed Jan. 3, 1994, now U.S. Pat. No. 5,499,340.

Much of the software used on mainframe computers, minicomputers, work stations, and personal computers consists of proprietary software licensed from software vendors. Like book publishers, many software vendors retain the copyright on their products, and a software product license usually restricts the licensee's use of the product in several ways.

Software products are usually obtained under a perpetual license, which is equivalent to buying a copy of a book, but are sometimes licensed on a renewable basis, which is equivalent to borrowing a book from a rental library. In either case, the scope of use of the software products is almost always further proscribed.

Software products are often licensed for use only on particular computers, as determined by their serial numbers, or for use on a maximum number of computers, or for use on a maximum aggregate amount of computing power (typically measured in MIPS, millions of instructions per second), products may be licensed only for use by certain named user or by a stipulated maximum number of concurrent users.

Products may also be licensed based on particular usage metrics, as appropriate for the product in question. For example, a sorting product might be licensed based on how many sort operations the licensee uses it for, based on the number of bytes of data sorted, on the number of records sorted, or on some combination of these factors. A product providing database inquiry capability might be licensed based on the number of inquiries performed, perhaps weighted by the complexity level of each inquiry. A product that performs a number of disparate scientific or engineering calculations might assign a charge-value for each type of calculation and, then base license fees on the aggregate of these values. Or, it might instead simply keep track of the total CPU-time used in performing calculations, and base licenses on this value.

Licenses based on usage metrics may be of the "electric meter" type, in which actual usage is measured, and paid for by the licensee on a periodic basis (monthly, quarterly, etc.). Licenses may be based on a mutually agreed-to "cap", such that any amount of usage that does not exceed the cap is covered by a fixed periodic payment, or perhaps by a single initial payment, with additional fees due only if the cap is exceeded in a given measurement period. This latter arrangement is similar to the maintenance contracts on office copiers, commonly permitting no more than, but any amount fewer than, a stated maximum number of copies per month.

The various licensing mechanisms described above may be elaborated or combined in whatever way the vendor of each software product may choose.

Several trends in the data processing industry are hastening the move away from the more simple types of licenses, for specific computers for example, toward the more complicated licenses. Mainframe computers are evolving into "complexes" of linked computers, with all computing work eligible to run on any available computer in the complex. In such an environment, if software were licensed for use on specific computers, each software product would have to be licensed on all the computers of a complex, no matter how infrequently or non-intensively the product is to be used. Licenses based on usage metrics are much better aligned with the actual value that the end-user derives from the licensed software.

Similarly, the rise of distributed and client-server computing, and of the Internet as a vehicle for distributed computing (e.g., Java), have put strains on the total-user or concurrent-user licensing terms that are common in these environments.

These factors make it increasingly necessary for vendors to have access to ongoing information as to how, where, to what extent, and by whom their software is being used. In order to control the use of licensed software to prevent authorized levels being exceeded, it is increasingly necessary to provide "authorization codes" to users that tell the licensed software product, during its operation, the applicable limits.

Some software products incorporate functions and facilities that monitor their own usage and enforce license terms (for example, by limiting the number of concurrent users of the product, or limiting usage to registered user who sign on with unique passwords), or which merely report on usage and warn of usage beyond the terms of the license. In many cases, these functions are provided by products supplied by third-party vendors to be incorporated by software developers.

In addition to facilities meant to be incorporated into other products on an individual basis, software products exist for gathering the required information from several different products, either with or without the cooperation of the products to be monitored. These tools operate on the user's computer system or network, and gather information as to what is installed and what is used on that system or network, as well as the type and particulars of the usage. For example, the assignee of the present invention vends two such products that operate on mainframe computers, SoftAudit and LicensePower. There are dozens of products from other vendors that gather some of the described information in other environments, such as networks, client-servers, desktops, or the Internet. But all of these products provide information to the computer user, and the information itself typically pertains to a plurality of software products, often licensed from a number of different vendors. Should the user wish, or be required, to transmit to one or more vendors the information pertaining to the products licensed from them, the user would have to manually extract, gather, and collate the information by vendor and product, then separately transmit appropriate information to each vendor.

Disadvantageously, vendors who require this information from their licensees would receive separately transmitted information from each such licensee.

SUMMARY OF THE INVENTION

Accordingly, it is an object of the present invention to provide a method and apparatus for collating, correlating and redistributing information about the use of specific products in accordance with the vendors thereof.

A further object of the invention is to provide a software license verification method which operates automatically.

Yet another object of the invention is to provide, at a central processing facility, a system which communicates with individual software usage sites and users, monitors/audits the use of various software products at the various sites, and generates reports for each individual vendor about the use of that vendor's products at the various sites. A report can be in the form of electronically transmitted information.

A further object of the invention is to provide an apparatus and system for automatically billing users of a diverse range of software products from a central location.

The method and apparatus of the present invention comprises a system for collating, correlating and redistributing information about the use of licensed software products at various computer sites. The system consolidates information (originally captured by other systems) by time period, such as day, week or month, about which licensed software products are installed at each computer site, as well as to what particulars of use are relevant. This may include the number of invocations of various software products, the number of logons, the number of concurrent users, as well as other usage metrics. The information is sorted by vendor, so that the information about all of the software products licensed from a particular vendor can be periodically (or as it develops) sent to that vendor, automatically, or in response to prompting by vendors or from within the central computer system.

More particularly, the apparatus of the invention serves for software license verification at plural, discrete computer sites and includes a local software usage monitoring facility. Such a facility may (but need not) comprise:

a central computer for communicating with the plural discrete computer sites;

each computer site including a local software usage monitoring facility. Such a facility may (but need not) comprise:

a. a memory and at least one software product stored in the memory;

b. a surveying program that surveys the memory and stores a list of software products in the memory;

c. a monitoring program that monitors invocations or usage of the software products at the discrete computer sites; and d. a reporting program that outputs a local report which quantifies the usage of the at least one software product at the discrete computer site (or, the foregoing computer site facility may comprise a process whereby the product itself records usage metrics);

a correlating program at the central computer which receives the local reports from the plural discrete computer sites and collates and orders, e.g., arranges, information in the local reports into data packets formed on the basis of vendors of the at least one software product; and a central reporting program at the central computer for communicating with vendors and reporting to vendors usage of software products at the plural discrete computer sites which are licensed by the vendors.

In preferred embodiments, the central computer includes software facilities for, among other things, prompting the local reports to issue from the discrete computer sites, in response to prompting commands from the central computer to the discrete computer sites. Another software facility serves for transmitting vendor originated authorization codes to the discrete computer sites. Another software facility receives authorization data from the plural discrete computer sites. Yet another software facility prepares and transmits to the discrete computer site software usage billings. A further software facility at the central computer calculates the amount of royalties owed for the use of software products at the discrete computer sites. A further software facility controls disbursements to the vendors of monies received on account of the discrete computer sites.

Other features and advantages of the invention will become apparent from the following description of the invention which refers to the accompanying drawings.

DETAILED DESCRIPTION OF EMBODIMENTS OF THE INVENTION

Figure 1:
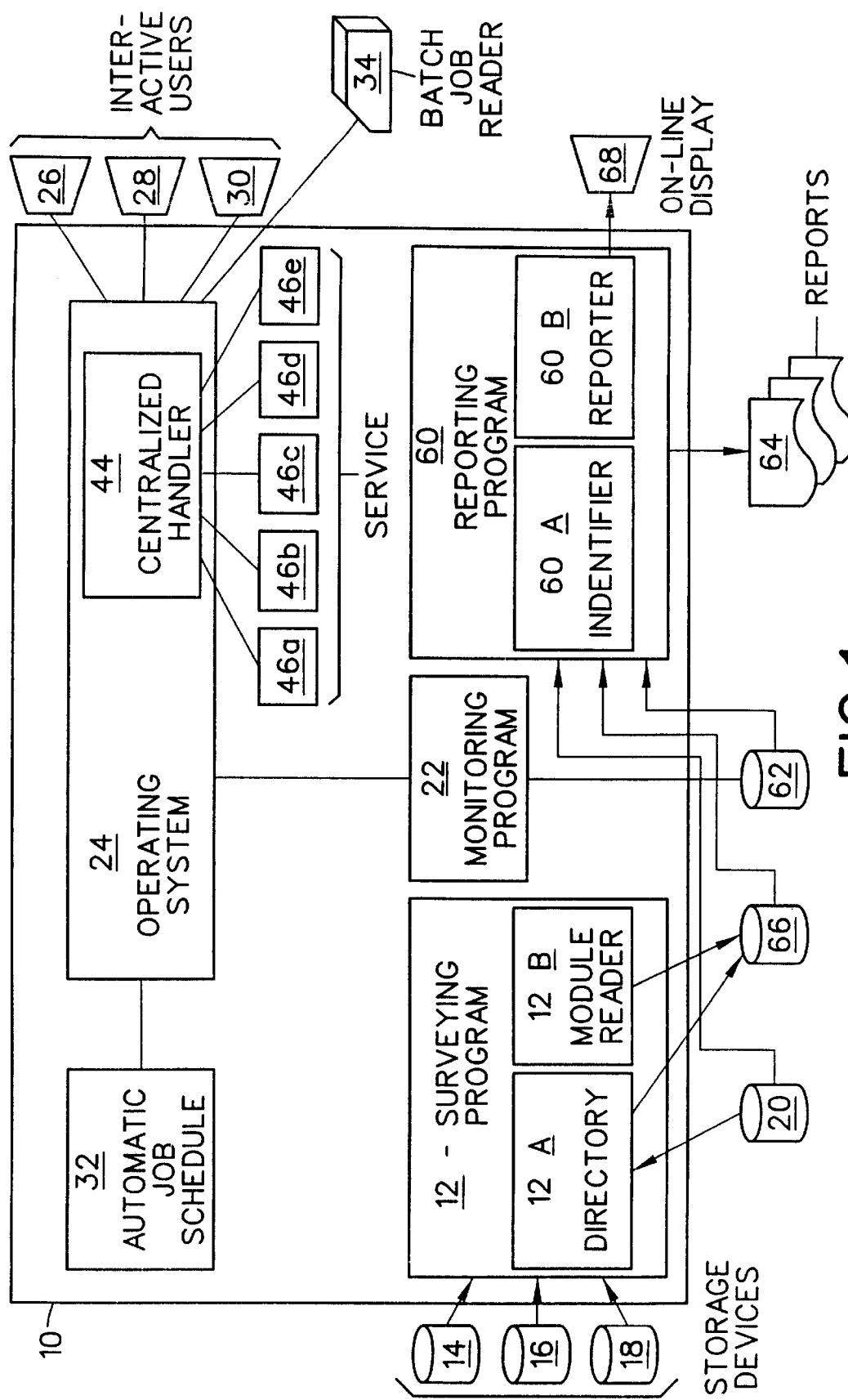
FIG. 1 is a block diagram illustrating a computing system for surveying and monitoring the use of various software products at a given licensee site.

In the present inventor's prior application Ser. No. 08/180,218 there is described a method and apparatus for computer program usage monitoring. The contents of the prior application (which has issued as U.S. Pat. No. 5,499,340) are incorporated by reference herein. In FIG. 1 thereof (which corresponds to FIG. 1 herein), the layout of a system for program usage monitoring is described. As is conventional, the computer system 10 includes an operating system 24 and may include an automatic job scheduler 32. As is also conventional, the computer system 10 connects to peripheral devices, examples of which are shown in FIG. 1 and may include storage devices 14, 16 and 18, interactive user terminals 26, 28 and 30, and a batch reader 34. Not all of these peripheral devices are required to be present, and varying computer systems will have differing peripherals. The operating system 24 may contain a centralized handler 44 for the processing of service requests, where this is the case, services 46a–46e are usually also provided.

As used in this document, the term program or program module is used synonymously with executable file. Also as used herein, a "software product", or "product" is a related group of files comprising at least one module. A product may comprise additional modules and/or non-executable files. As used herein, product generally refers to a particular "version" of a given product.

FIG. 1 comprises a system for monitoring, tracking, and controlling the use of software products and the module or modules that comprise them. In a preferred embodiment, the invention includes a computer system having four main components, three of which are executable programs and one of which is an arrangement of information for use by those programs. The four main components are a surveying program, a monitoring program, a reporting program and a knowledge base.

Turning first to the surveying program 12. The surveying program 12 examines all the storage devices 14, 16 and 18 on computer system 10 to determine the program modules present. Optionally, the user can restrict surveying program 12 to examine, for example, only selected storage devices or selected libraries.

The surveying program 12 surveys storage devices 14, 16 and 18 when requested to do so by an operator (e.g., operator 26), any other program (e.g., the monitoring program 22), or periodically. Normally, an operator 26 invokes the surveying program 12 to survey storage devices 14, 16 and 18 when the present invention is first introduced into a computer system 10. An operator 26 may request the surveying program 12 to survey a single storage device, (e.g., storage device 14), for instance, because the operator 26 knows either that a software product has been installed on that storage device 14 or that a software product has been removed from that storage device 14 since the last time the survey program 12 surveyed that device 14.

The surveying program 12 has two main sub-components. The first subcomponent is a directory surveyor 12A which examines entries in a program directory to determine what program modules are present. The second sub-component is a file reader 12B that scans the contents of program files not recognized on the basis of its directory entry alone.

In a preferred embodiment, the directory surveyor 12A reads the program directory of the storage devices 14, 15 and 16, and ascertains which entries represent executable files on the basis of the entries in the directory. How a particular operating system 24 designates any of the entries as referring to program modules or non-executable files varies. An operating system 24 may indicate that a directory entry is associated with a program module by special flags, naming conventions, or otherwise. This is familiar to persons skilled in the particular operating system 24. On PCs, for example, executable files have extensions of .EXE or .COM. (Of course, one can name a non-executable text file as if it were executable, so this is not completely reliable). Under MVS (On IBM mainframes), executable files are recognized by the format in which they are stored. Again, this is not certain, but probabalistic; the program will occasionally misidentify a nonexecutable module as executable. Directory surveyor 12A then compares the names of the modules it finds (in the program directory) to module names represented in knowledge base 20, and records pertinent information in system configuration log 66 about the matches found.

It is important to note that the system configuration log 66, the knowledge base 20 and the recorded information log 62 are general collections of information. The information comprising each of these collections may be stored in a single file or may be stored a multiplicity of separate files and other memory areas. For example, in a preferred embodiment, the knowledge base 20 comprises the following types of information:

Module records: For each module, a module record contains the module name and the product ID of the product to which it belongs. (As indicated earlier, module names can be indicated in a generic fashion.)

Product records: For each product, a product record contains the product ID, the product name, the vendor ID, and (optionally) the product code used by the vendor for that product.

Vendor records: For each vendor, a vendor record contains the vendor ID and the vendor name.

Vendor Product Code Records: For particular vendors that use recognizable product codes, for each such product, the product code and the corresponding product ID. For example, IBM is known to use product codes of the form "56nn-aaa" or "57nn-aaa", where "n" is any digit (0–9) and "a" is any (printable) character "5740-CB1" for example, is the COBOL OS/VS Compiler and Library (which, in a preferred embodiment has been assigned the product code "COBCLIB").

The knowledge base 20 modules can be represented through the use of a wild card, i.e., in a generic fashion. For example, a single module record for the name "ABC*", would be considered to match any actual name beginning with "ABC". The use of wild cards in a search is well known in the art.

The file reader 12B scans, or reads, the files associated with directory entries and searches for copyright statements "COPYRIGHT", "COPR", or "(C)" (in either upper or lower case), recognized vendor names, recognized product names, and unique sequences or strings of text conforming to patterns recognized as product codes of particular vendors. As described above, this information, including copyright statements, vendor names, etc., which file reader 12B looks for may be stored in the knowledge base 20 or hard coded into the file reader 12B.

In a preferred embodiment, the surveying program 12 creates two types of records: one for modules identified by the directory surveyor 12A and one for modules identified by the file reader 12B. Both types of records contain module name, library name, volume name (i.e., the physical disk on which the library resides) and product ID. The latter record type, which are identified on the basis of a recognizable string, also contains data in the neighborhood of that string; the amount of the data that is contained therein can be varied. In a preferred embodiment it is 200 bytes of data.

Where a module name is not represented in the knowledge base 20, but the vendor has been recognized because of information found by the file reader 12B, a flag or indicator is substituted for the module name in the record. In this case, the module will appear on reports listed as being an unknown product of that vendor.

The second major component of the system of FIG. 1 is a monitoring program 22. The monitoring program 22 records pertinent information in a recorded information log 62 when certain events occur.

Typically, for each module used, the information recorded by the monitor consists of the module name, the library name from which it was loaded, the volume of the library, the product ID, the job name using the module, the step name using the module, the job start date and time, the job number assigned by the job scheduling/managing program, and the user ID. If the module is not loaded from a library but is resident, an indication of this is recorded. Depending on the operating system, other relevant information may be available, and is recorded, and some of this information may be unavailable. For compactness, this information may be reorganized. In a preferred embodiment, one record is created containing all the job-related information (start date and time, job number, etc.), another record is created containing step related information (step name, etc.), and another record is created for each module used during that step. Later, in the reporting phase, this information is reorganized as appropriate.

In a preferred embodiment, program execution would be monitored as such an event, thus, when a program module is executed, pertinent information is recorded by the monitoring program 22.

Among many other functions the operating system performs, it accepts instructions as input from a variety of sources including interactive user, 26, 28, 30 automated job schedulers 32, batch job readers 34, and other programs. From these many sources of instructions, the operating system constructs one or more instruction streams which are lists of instructions to execute sequentially. In a multi-processing, multi-threading, or multi-tasking environment, several instruction streams may be operated upon concurrently.

In a preferred embodiment, the monitoring program 22 can monitor, or "see," a system service request as an event regardless of whether the particular operating system 24 permits services to be invoked directly or whether they are invoked through a centralized handler 44. The monitoring program 22 is introduced at one or more appropriate points of the operation of the operating system 24 so that every event desired to be monitored can be known to, or "seen" by, the program. Techniques for introducing, or "hooking", an additional set of instructions into an existing program or operating system 24 are familiar to those skilled in the art. These may include techniques such as renaming an existing module and substituting a module with the original name or dynamically changing an address vector to point to the new program, and retaining the address of the original program so it can be invoked after the new program completes its operations.

Where there is no centralized handler 44, the monitoring program 22 would "hook" into numerous places in the operating system, such as program loading and termination calls. The places to "hook" into, of course, depend upon the events to be monitored. Thus, where there is no centralized handler 44, monitoring program 22 would "hook" into appropriate points of the operating system 24 which would likely include the execution of the individual service routines, for instance: a program loader, in the case where program "load" is being monitored.

Referring back to FIG. 1, another component of the system is the reporting program 60 which sorts, correlates, consolidates, summarizes, formats and outputs reports 64 based upon the information gathered by surveying program 12 and monitoring program 22, e.g. the information stored in system configuration log 66 and recorded information log 62 respectively.

In a preferred embodiment, reporting program 60 can, using the information stored in system configuration log 66 and recorded information log 62, produce output reports 64. To produce reports, reporting program 60 correlates the recorded information regarding events that have occurred and surveyed products on the computer system and can produce an almost infinite variety of reports. For instance, after correlating this information, reporting program 60 could produce reports: listing the products that are installed in duplicate along with a list of users which are accessing each copy; listing the number of accessed per unit time for any product; listing products which are routinely denied access due to the number of licenses; listing products that are accessed (or attempted) by unauthorized users; and/or listing all versions of a product currently installed, along with a list of the number of users that utilize each. Of course, many other reports can be made using this information; once the event data is correlated with the associated software product, the analysis and assembly of the remainder of this information into useful reports would be familiar to one of skill in the art.

In a preferred embodiment, the reporting program 60 comprises two components, the identifier 60A and the reporter 60B. The identifier 60A does the most of the correlating, consolidating and filtering that would be necessary to produce any report. (The identifier, for example, associates the product ID code and module records and searches for various text strings stored for records identified on the basis of a recognizable string.) The reporter 60B performs only the final stages of sorting, consolidating and formatting. The fourth main component of the present invention is the knowledge base 20 which comprises module names and the relationship of the modules to products with which they are associated. Knowledge base 20 may contain other information, such as product names, vendor names, vendors' products numbers, etc.

At a typical computer installation, the present invention is loaded into the computer system 10 and the surveying program 12 is run. Once this has been done, the monitoring program 22 may be run continuously or for a sampling period. (Note that it is typical, but not required, that the surveying program 12 is run prior to running the monitoring program 22.) Once the surveying program has surveyed the storage devices 14, 16 and 18 and the monitoring program 22 has run for at least a sample period, the reporting program 60 may be run to report on system usage during the sampling period.

Now turning to an examination of each component in more detail, in typical usage, the surveying program 12 is executed so that it may examine the storage devices 14, 16 and 18 on computer system 10 and determine what executable files are present. Using the information contained in knowledge base 20, surveying program 12 determines which products are installed on computer system 10. This information is recorded in system configuration log 66 for use at a later time and may be optionally presented to the user in printed format, on-line display, or output in some other suitable form 64.

In a preferred embodiment the information is presented to the user at an on-line display 68 where the information may be searched, scanned, and otherwise manipulated. This information may be presented to the user by surveying program 12 itself, by reporting program 60, or by another program. Programs to display and manipulate information are well known in the art.

If the operating system 24 or an extension thereto were to so provide, the monitoring program 22 could be configured to monitor the installation of new software as an event. When monitoring program 22 detects that new software has been installed, it could invoke surveying program 12. By so invoking surveying program 12, the information regarding installed products would be kept up to date automatically.

Similarly, if the operating system 24 or an extension thereto were to so provide, the monitoring program 22 could be configured to monitor the deletion of software as an event. Upon detecting this event, monitoring program could invoke surveying program 12, similarly keeping the information regarding installed products current.

The monitoring program 22 may be activated for a sample period, or it may be operated constantly. Typically, when used to monitor licensed software, user accesses and the like, the monitoring program 22 would normally be operated constantly. On the other hand, when used to accumulate information regarding utilization of various products and/or product versions, and to determine usage patterns, the monitoring program 22 may be activated for a sample period.

The length of the sample period in which to operate the monitoring program 22 depends upon the particular characteristics of the computer system 10 and the operating system 24 upon which the monitoring program is being run. In a preferred embodiment, such a sample period would be between a week and about two months. It is, however, important to note that certain products may only be executed, e.g., annually. Where this is the case, the monitoring program 22 would not "see" the activation of these products unless its sample period included the time when at least one of its modules were executed.

The monitoring program 22 may be used to monitor a sample period, and produce a report reflecting system usage. To carry out the sample period monitoring, once monitoring program 22 has run for a period deemed sufficient by the user, the information obtained by it, and stored in recorded information log 62, can be processed by reporting program 60 and presented to the user in a usable format. For example, a user may request a listing of a particular product indicating how many times any module of the product was executed during the period monitored. To produce that report, reporting program 60 would check the system configuration log 66 to determine which modules are associated with a given product, thereafter, the recorded information log is scanned for execution events for the module names associated with the product occurring during the period in question. Total executions may be maintained in memory and the information can then be presented to the user in printed format, on-line display, or some other suitable form 64. In a preferred embodiment, where the information is presented for on-line display, the user can be permitted to search, scan, and otherwise manipulate it.

Once monitoring program 22 is activated on the system, when each monitored event occurs, information relevant to that event is recorded in the recorded information log 62. Typically, this information includes the time and date, the name of the file being executed and the identity of the user, job, or program that initiated the file. Also included can be the location from which the program was obtained, for example, the program library or area of main storage. This recorded information log 62 may be recorded in main storage or in auxiliary storage such as magnetic tape or disk, printed out, etc. In a preferred embodiment, the recorded information log 62 would comprise recorded information in main storage and recorded information written to auxiliary storage. In a preferred embodiment, monitoring program 22, would periodically write a cached portion of the recorded information log 62 in main storage to the recorded information log 62 in auxiliary storage.

The monitoring program 22 may, under the control of user specifications, restrict its attention to certain modules, certain types of modules, modules obtained from certain locations, certain products, certain kinds of events, certain times of day, or days of the week, etc.

The monitoring program 22 can also be used to ensure compliance with licenses, both in terms of whether a given computer is licensed to use a given software product and whether the licensed number of users on a given computer has been exceeded. In order to monitor this type of information, it is preferred that monitoring program 22 is run continuously, rather than for sampling period. When used to ensure compliance with licenses, monitoring program 22 is supplied with a list of software products to be monitored, optionally this list may include information regarding which computers are authorized to run each product and the number of concurrent users permitted. Monitoring program 22 may check the list whenever an event occurs which would require authorization, e.g. a program execution. If monitoring program 22 determines that authorization is to be denied, it causes the event to fail, for example, by "abending" rather than permitting execution of a program in the case of program execution. Monitoring program 22 may additionally issuing a warning message and would, in a preferred embodiment, write an entry in recorded information log 62.

When determining whether a particular computer is authorized, monitoring program 22 may obtain identifying information as to which computer originated the request to execute the program in a similar fashion as it obtains other event information. In the case of checking the number of concurrent users, monitoring program 22 would maintain an individual count for each program to be monitored, incrementing the count each time it allows the program to be initiated and decrementing it each time the task (job, address space, etc.) that initiated the request terminates. In this case, monitoring program 22 would also monitor such terminating events.

A number of variations and enhancements follow from the basic invention. For example, surveying program 12, monitoring program 22 and reporting program 60 can be directed to survey, monitor, and report only a user-specified list of products, or can be confined in their operations in other ways. Also for example, knowledge base 20 can be supplemented by information provided by the user. Further, the surveying program 12 can make use of other data bases it finds on the system to relate program module names to product names.

A possible major enhancement to the basic invention applies to networks of computers. For example, a number of PC computers or microcomputers can be linked. In that case, monitoring program 12, or a separate program, can automate the periodic downloading and execution of surveying program 12 and/or monitoring program 22 on the computers, as well as the periodic uploading of the resulting information. This could be carried out with PC computers or microcomputers linked to a mainframe computer, or alternatively, in a peer computer network. Thus, automatically or at user request from one computer, information can be gathered about products installed on a number of other computers, as well as information about their actual usage.

Further, monitoring program 22 can be enhanced to monitor the execution of transactions that run under the control of a teleprocessing monitor such as CICS, IMS, and INTERCOMM. A teleprocessing monitor provides an environment in which on-line applications are run concurrently. Such applications, known as transactions, are typically executed from within the teleprocessing monitor without using the system services used to recognize execution of ordinary files. This enhancement involves analyzing each teleprocessing monitor that the monitoring program is to support, identifying the mechanism by which the teleprocessing monitor invokes a transaction and, as discussed above, introducing additional instructions at the appropriate points to capture and write out the required information.

Figure 2:
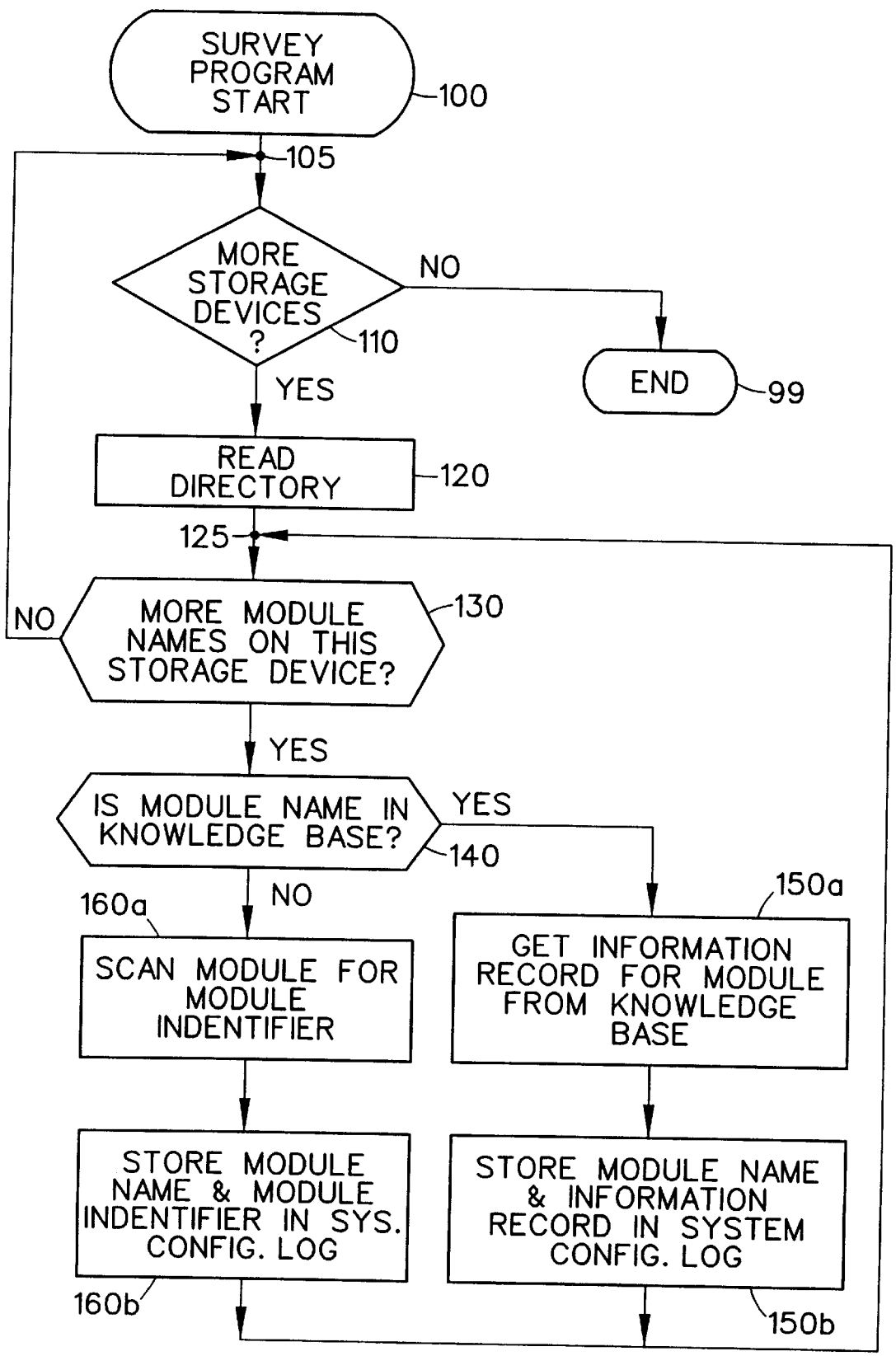
FIG. 2 is a flow chart illustrating the flow of a survey program of the system of FIG. 1.

Turning now to the flow chart in FIG. 2 which describes the flow of the survey program (12, FIG. 1). The survey program 12 is initiated at 100. Once initiated, the survey program at 110 determines whether there is a storage device (14, 16 and 18, FIG. 1) that requires surveying. If there is a storage devices that requires surveying, survey program 12, at 120 reads the directory or directories of that storage device. If there are no storage devices which require surveying, the survey program 12 terminates at 99.

Survey program 12 then, at 130 reviews the directory or directories of the storage device to determine whether there are modules therein which have not been recorded in the system configuration log (66, FIG. 1). If it finds that there are no such modules, survey program 12 returns to location 105, so that it may proceed to the next storage device. If, however, there are modules which have not been "surveyed" by survey program 12, at 140 survey program 12 searches the knowledge base for the module's name.

If the module's name is found in the knowledge base, at 150a, survey program 12 gets the information record stored in the knowledge base that is associated with the module's name. Subsequently, at 150b the module name and the associated information record are written to the system configuration log 66. If, however, the module's name is not located in the knowledge base, at 160a the module itself is scanned for a module identifier. As discussed above, a module identifier could include a product code or copyright found in the module itself, among other identifiers. Once the module identifier is located, at 160b, the module name and its associated identifier are written to the system configuration log 66. Having stored the appropriate information in the system configuration log 66, the survey program proceeds to location 125 so that it may determine whether additional "surveying" of modules on this storage device is required.

Figure 3:
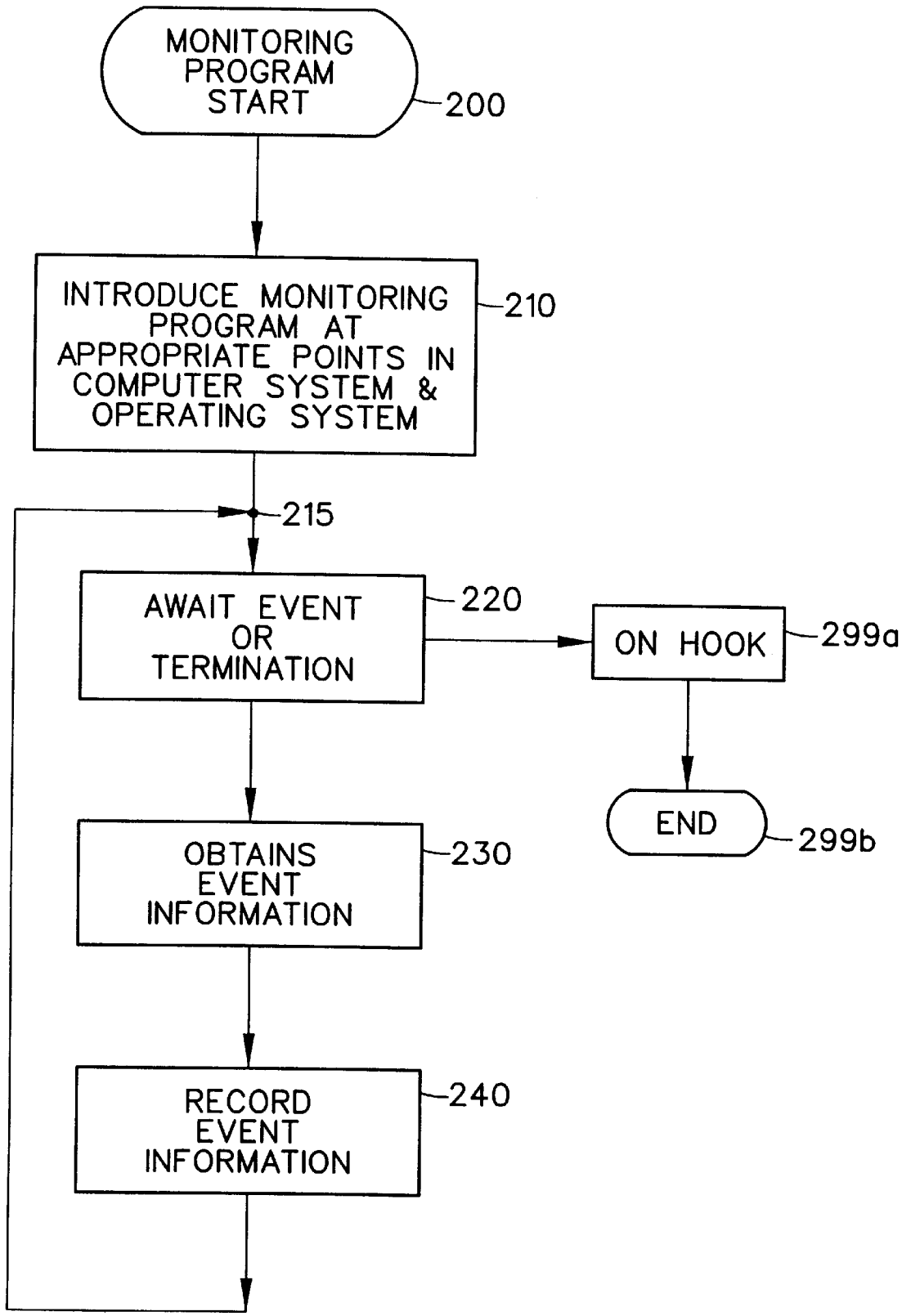
FIG. 3 is a flow chart illustrating the flow of a monitoring program of the system of FIG. 1.

Turning now to the flow chart in FIG. 3 which describes the flow of the monitoring program (22, FIG. 1). The monitoring program 22 is initiated at 200. Once initiated, the monitoring program, at 210 introduces itself at the appropriate points of the computer system 10 and the operating system 24. As discussed above, these appropriate points depend upon the type of computer system, operating system into which they are introduced, and also depend upon the events that will be monitored.

Once monitoring program 22 is introduced into the computer system 10 and operating system 24, at 220, it awaits an event. If it receives an instruction to terminate, at 299a, it takes appropriate actions to remove itself from the points it had introduced itself to at 210, and then, at 299b, it terminates.

When monitoring program 22 receives indication that one of its monitored events has occurred, at 230, it obtains event information. At 240, this event information is recorded in the event information log (62, FIG. 1), and the program goes to location 215 to await another event.

It should be noted that monitoring program 22 could introduce itself at 210 to receive many types of events. Once an event is received, at 220, monitoring program 22 could determine whether the event is the type it will record in step 240; if it is such an event, monitoring program 22 may proceed to 230 and obtain event information, if it is not such an event, monitoring program 22 may ignore the event, remain at 220 and await another event. This latter method of filtering events by the monitoring program 22 is useful because it permits dynamic changes in the events that are monitored without additional introduction into points in computer system 10 and operating system 24.

Figure 4:
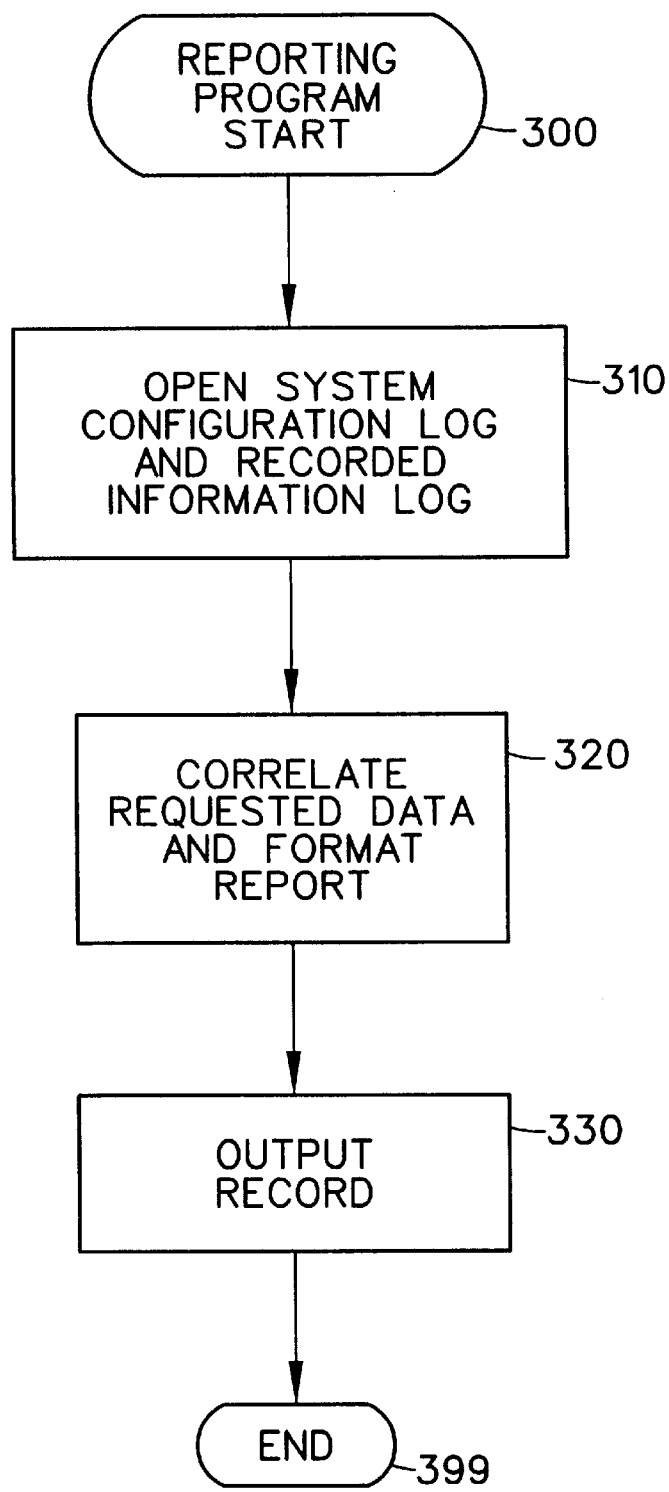
FIG. 4 is a flow chart illustrating the flow of a reporting program.

Turning now to the flow chart in FIG. 4 which describes the flow of the reporting program (60, FIG. 1). The reporting program 60 is initiated at 300. Once initiated, the reporting program at 310 obtains access to both the system configuration log (66, FIG. 1) and the recorded information log (62, FIG. 1). Subsequently, at 320, reporting program 60 correlates at least event information in the recorded information log 62 and product associations in the system configuration log 66.

Also at 320, reporting program 60 formats the correlated data, and other desired data for output as a report. At 330, the report is output. Once the report is output, at 399, reporting program 60 terminates.

The method and apparatus described above monitors events relating to executable program modules, for example, the usage of computer programs. The method automatically records each monitored event at a particular program execution site, i.e., at a given computer, as described in the parent application. However, as noted at the outset, the art has not previously provided a method and apparatus for collating, correlating, and redistributing information about the events and conditions pertaining to the installation and use of licensed computer software products.

Figure 5:
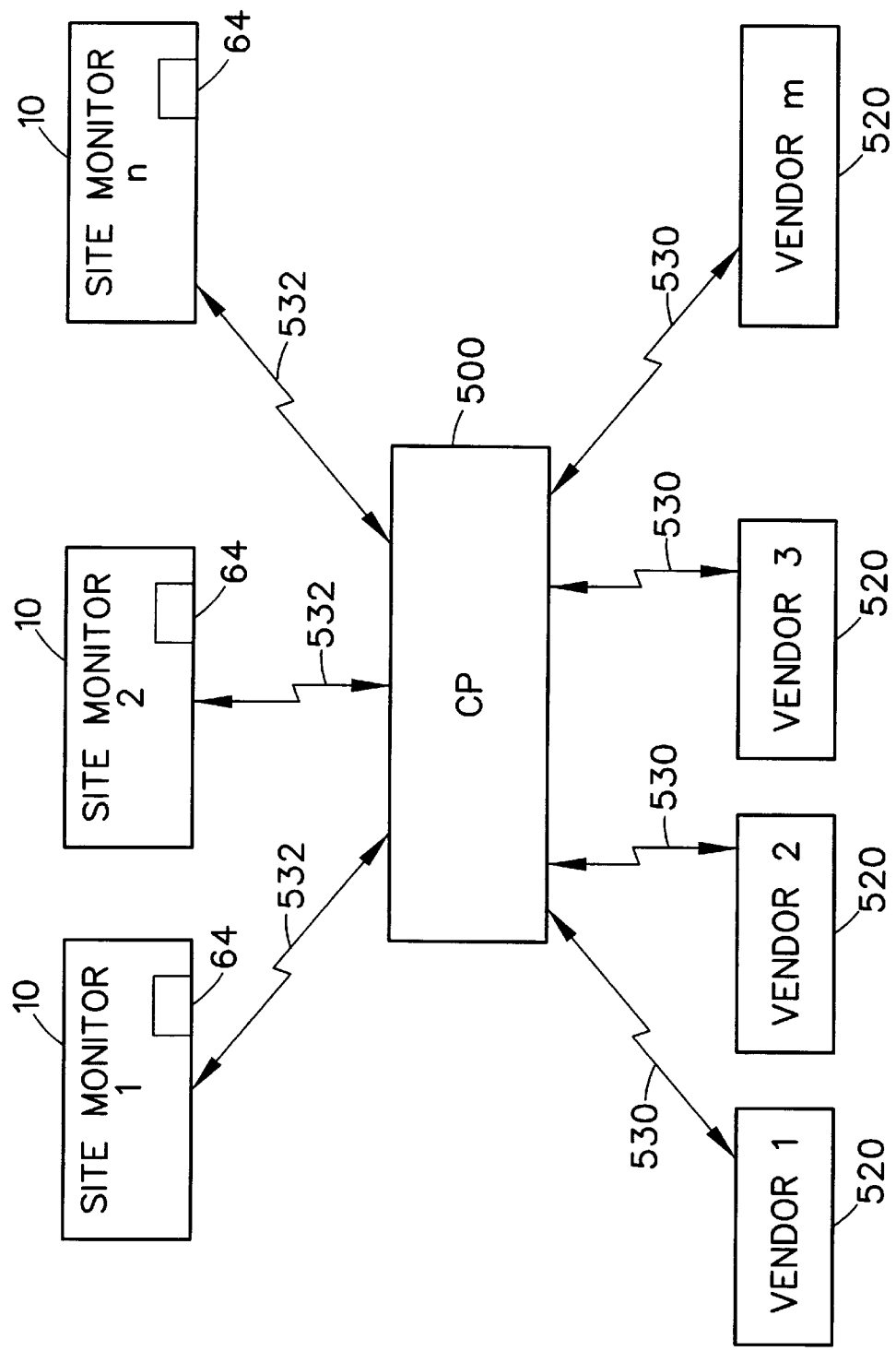
FIG. 5 is a block diagram of a computing system incorporating a plurality of the systems illustrated in FIG. 1 and a central processor (CP) of a central software license verification system.

With reference to FIG. 5, the data collected at the local computer sites 10 is outputted from each site in the form of reports 64, which reports are transmitted to a central processor (CP) 500 for consolidation, processing and transmission to various vendors 520 such as the vendors 1, 2, 3 . . . m. The licensed software users 10 periodically send all their gathered data, as a single bundle to the CP 500, which then redistributes it to the vendors 520 in a form usable by the vendors. The periodic transmission of data from the users 10 to the CP 500 could be initiated by an automatic scheduling process, without any user involvement. Alternatively, such data could be transmitted from a user installation as it is created (for example, each time a product is invoked, or whenever a product completes a stage of processing, such as the end of a transaction or a sort job).

At the CP 500, the data from the multiplicity of user sites 10 is intended to be processed concurrently, with each data element marked as to which user it originated from, which product(s) was used, the nature of use, etc. The data is then further sorted by vendor, user, and licensed product. All data pertaining to a particular vendor is then separately reported over the lines 530 for transmission to the corresponding vendor 520. This enables the vendors 520 to monitor user compliance with the licensed terms, and, if applicable, levy additional fees if usage activity exceeds licensed limits, etc. As yet another alternative, the CP 500 could retransmit the usage data to the appropriate vendor when it was received, rather than collecting it.

Transmission of data from the user 10 to the CP 500, and then from the CP 500 to the vendors 520 may be in the form of computer files, or data that is stored on tape or diskette or information transmitted electronically or via an Internet hookup.

As a further feature, the CP 500 could also perform centralized billing and collections of monies that might be due from users 10 to the vendors 520. For this purpose, the CP 500 stores within its memory a database of the license terms that pertain between each vendor and each user or product, so that if the periodic usage information received from a particular user discloses that license limits have been exceeded for one or more of the multiplicity of licensed products contained in the gathered data, then the CP 500 would render an invoice to that user for the sum total of all monies due to all of the vendors of those licensed products. The CP 500 is designed and programmed to remit to each vendor a single payment, representing the total of collections received, within a given reporting period, from all the users that pertain to that vendor's licensed product.

In a still further enhanced embodiment of the invention, the CP 500 performs centralized authorization. In this connection, the CP 500 distributes, on user requests or in response to information received from the various vendors 520, new authorization codes reflecting changes (typically increases) in the usage authorization of particular products licensed by each user 10. The CP 500 records these changes, and transmits them to the vendors in the same manner as usage data. Similarly, new authorization codes could originate with a vendor (for example, if new codes are to be sent to a licensed user of a particular product), in which case the CP 500 broadcasts the authorization code to all users of that product.

Figure 6:
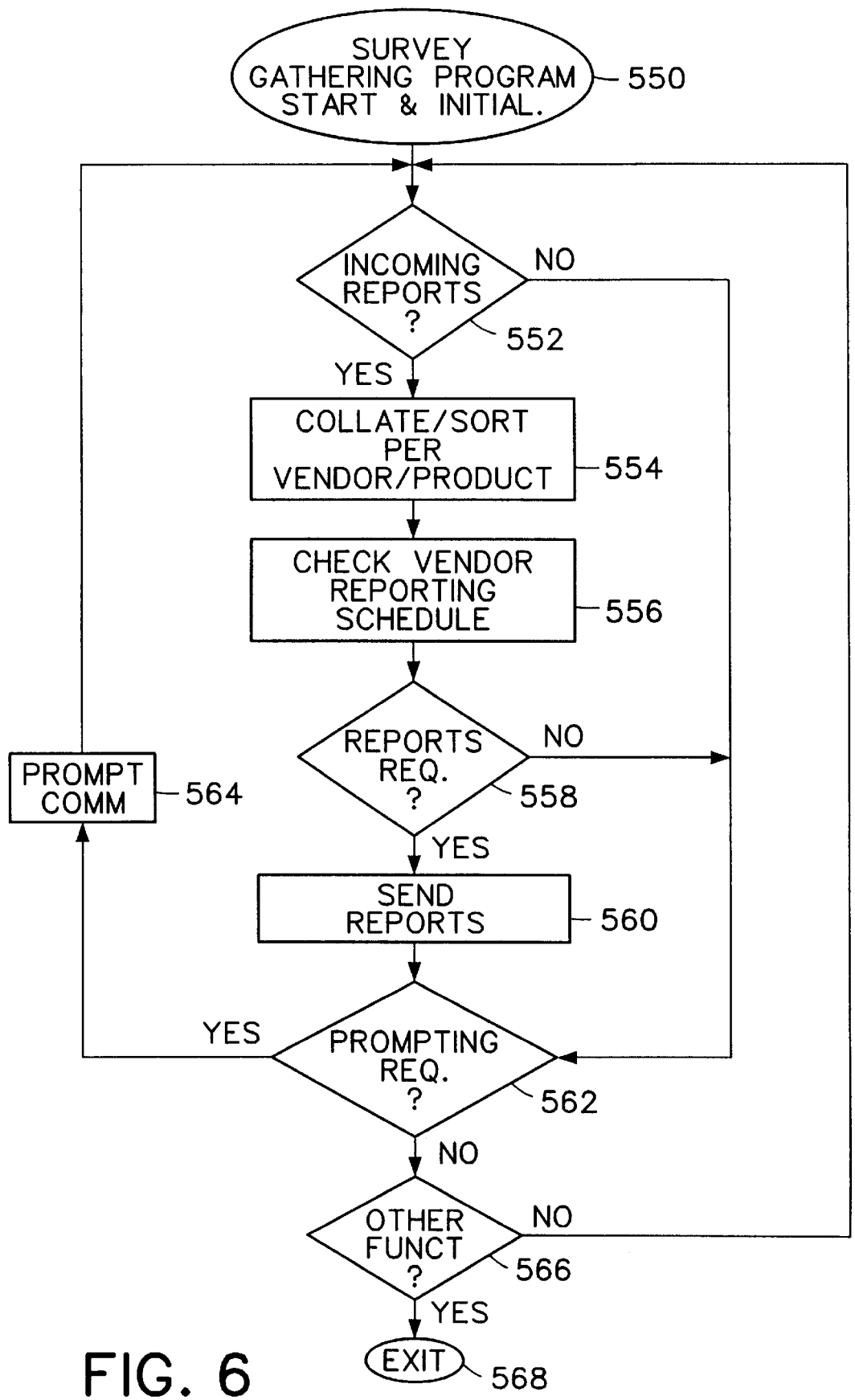
FIG. 6 is a flow chart of a survey results gathering and redistributing program.
Figure 7:
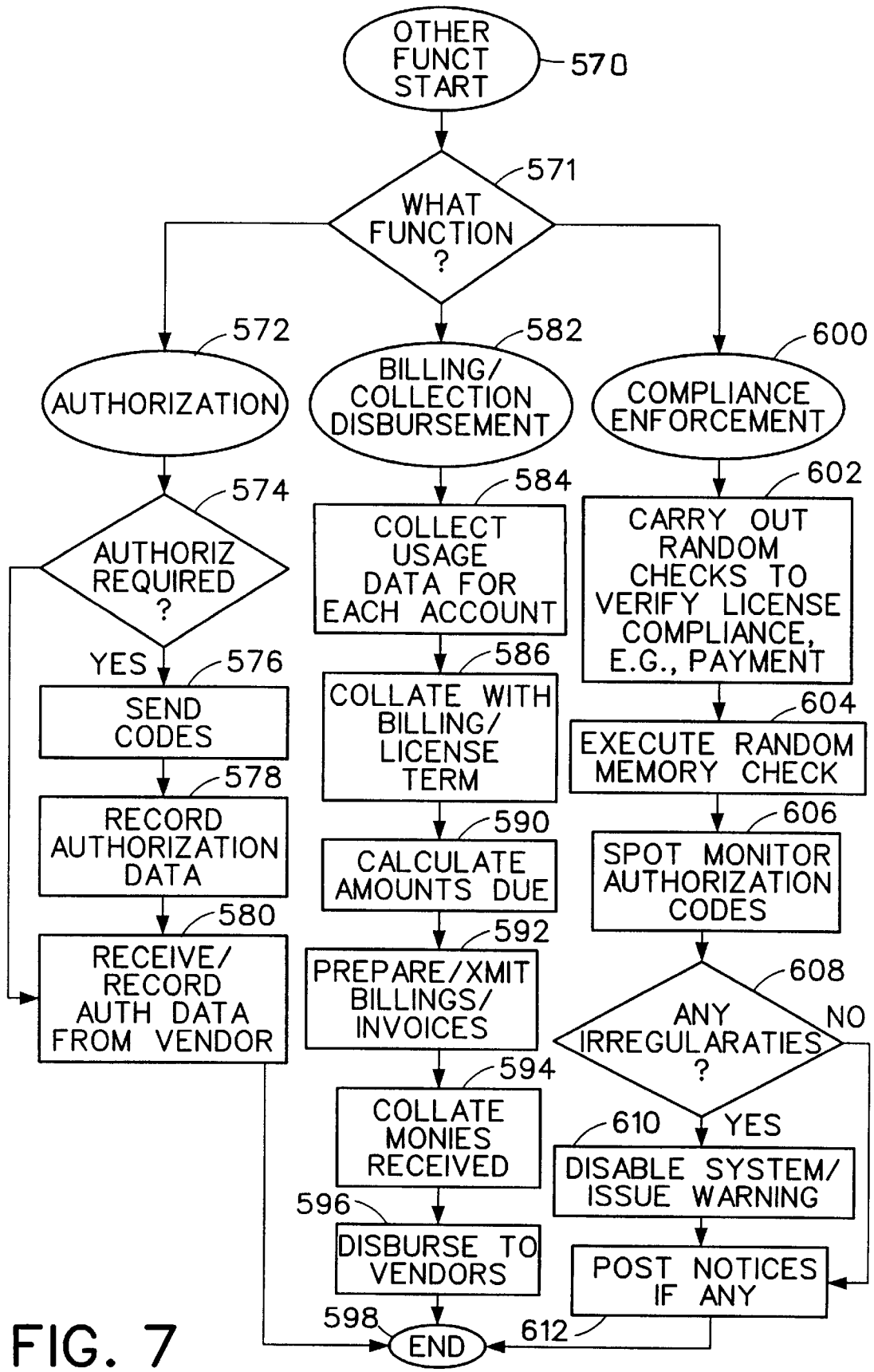
FIG. 7 is a flow chart of a software license authorization, billing and compliance monitoring program.

System flow charts of the various software routines executed within the central processor 500 are illustrated in FIGS. 6 and 7. Referring to FIG. 6, reference numeral 550 denotes the starting/initialization portion of the survey and gathering program 550 which queries at step 552 whether any reports 64 have been received from the various users 10 (FIG. 5) over the lines 532. If yes, the incoming data is collated and sorted, at 554, based on software products and allocated to one of the many different vendors 520 for which the CP 500 maintains records. Alternatively, if no reports have been received, the program proceeds to step 562 which is described below.

The program proceeds to step 556 where the particular vendor's reporting schedules are consulted to determine whether each given vendor requires immediate reporting of the information that has been received or whether that information is to be collected for periodic (daily, weekly, monthly, etc.) reporting. If reports need to be transmitted to the vendors 520, a decision to that effect is made at step 558 which proceeds to transmit the necessary report as indicated at 560. On the other hand, if no reports are required and/or after the reports have been sent, the program proceeds to decisional box 562 where the program queries whether any of the sites 10 (FIG. 5) require prompting to cause them to issue reports 64. In other words, it may be a feature of the invention that the reports 64 are received at the CP 500 from the users 10 only in response to prompting by the CP 500, rather than periodically. If so, appropriate prompting commands are issued to the users at step 564 and the program returns to monitor whether incoming reports have been received. Otherwise, the program proceeds to decisional box 566 to determine whether other functions are to be carried out by the central processor 500. If so, the program exits at 568 to attend to the various functions which are illustrated in FIG. 7. Alternatively, the program returns to decisional box 552 and the process continues.

Referring to FIG. 7, other functions performed by the CP 500 are executed under control of the software routines 570. Initially, at software decision box 571 a decision is made as to what function is to be performed. If the function is an authorization function, the program proceeds via program step 572 to decisional box 574, to inquire whether authorization of various user sites is required.

If any authorization of computer sites 10 is required, the necessary codes are sent to the site at step 576. Moreover, some systems require recordation of authorization data from the users and this is effected at step 578. The program then proceeds to step 580 where the program checks whether it has received from the various vendors updated authorization data that is relevant. If step 574 indicates that authorization is not presently required, the program proceeds to step 580 to detect whether it has received and recorded such authorization data from the vendors 520, in which event, the program is caused to run through end box 598 to return and reexecute the process including the steps 574 and 576 which transmit the updated authorization data to the various users.

If the function to be performed is billing, collection or disbursement, the program proceeds via step 582 to step 584 to collect and correlate the usage data for each account. The usage information is collated at step 586 with the billing/license terms that is stored in the memory of the CP 500. Software routine 590 calculates the amount due from each vendor and then prepares and transmits billing and invoices to the various users 10 as indicated at 592. Another software function performed by the CP 500 is to collate the various monies received from the users 10 and, as indicated at 594, to thereafter disburse these monies to vendors under the control of software routine 596. As before, the program returns through step 598.

If the CP 500 is commanded to monitor compliance or to enforce the license terms, the program proceeds via software block 600 to routine 602 which carries out various compliance procedures. These may include random checks on the contents of the memory at the user sites 10 to verify license compliance, thus ensuring that users have not tampered with or altered the software monitoring codes and/or verify payment. As indicated at 604, such compliance monitoring may involve the transmission from the CP 500 to the various user sites of special executable programs (which may change from time to time) that, for example, command the execution of programs which verify that the invocation of various software routines creates the appropriate outputs at the user site.

Compliance may also include surprise monitoring of authorization codes as indicated at 606. If any irregularities are noted as indicated at 608, the CP 500 may optionally disable the user's system. As yet another alternative, the CP 500 may operate to issue appropriate warnings to the user sites. For example, a message may be caused to be printed on the printer at the user site or appear on the display console in the form of a warning that failure to comply with certain payment schedules will result in disablement of the system within a given time period, as generally indicated at 610. If no irregularities are noted, the CP 500 proceeds directly to step 612 which is now described.

The program may be used as indicated in software routine 612, for posting various notices of the vendors, in response to program conditions or in response to information received from the vendors 520. Such notices may comprise information about upcoming upgrades to the licensed software and the like. For example, the availability of the CP 500, which communicates directly with the user sites, can also be deployed to automatically upgrade software packages to reflect latest changes. Such updates may be caused to be automatically installed during non-working hours, enhancing efficiency, promoting customer satisfaction and improving the vendors' control over their proprietary software products.

In addition to the foregoing, the present inventors include within the scope of the invention the following features, characteristics and elements.

Payment for software could be made by having the user purchase a "debit card", a secure, encoded value that could then be "worked off" through usage of one or more products. This function would reside at the user's site, within the usage monitoring or license management function, or within the process that gathers usage info for transmittal to the central site. When the debit card needs refilling, this would be done by communication with the central site, with the central site allocating payments to the vendors based on the way the prior fillup was used.

Distribution of software could be centralized, with master copies of software supplied by the vendors to the central site, which then transmits the software to all licensees, either at the command of the vendor, or at the request of the licensee. Users could also use this mechanism to license (and pay for) additional software or additional license rights, on demand, with the central site consolidating this information for transmittal to the vendors, and possibly performing the billing. Updates to software (either new versions, or corrections to existing versions) could be handled as above. All usage information, instead of being gathered, batched, and periodically transmitted to the central site, could be sent to the central site in real time, with accumulation occurring at the central site. Similarly, the central site could redistribute the usage information to the vendors in real time rather than batching it.

The concept of "usage" as used herein and/or a reported event includes all detected events, including those relating to compliance issues, such as software or database access requests that may have been denied because they violated license terms, or that were permitted even though they violated the license terms. The act of installing software or data (even without using) may similarly be reported as a usage event. The "policy" information, that is, the license terms and conditions that apply to a particular user's use of a particular product, which are typically supplied by the vendor in encrypted from, and which may be input into a license manager to manage compliance, could also be consolidated at the central site for transmission to the vendors so that they might verify that the terms put in effect matched those they had authorized. The central site, at the direction of a vendor, might send a directive to the license management or usage gathering functions at one or more users, causing it to modify the manner in which license terms are administered and/or usage is measured (for example, if multiple types of usage are weighted, then combined into a single number, the weighing factors could be changed).

Furthermore, it is not necessary that the "central site" computer be physically located away from the local sites. To the contrary, a central site computer may be located at or even operated by the user. That is, all or most of the central site functions might be done on or at the user's central system, on behalf of several of the user's other systems.

The concept of a monitored "event" as used herein is not necessarily limited to the monitoring of the usage of a software product as such. An "event" includes the monitoring of the usage of proprietary information, e.g. copyrighted text, pictorial and data stored in databases. Owners, vendors, licensors, licensees, etc. of valuable copyrighted material are becoming increasingly concerned about the piracy of such information when transmitted over public communication systems such as the Internet. The present invention provides a technological solution in the form of the above-described system which may be deployed as an instrumentality in monitoring the use of copyrighted subject matter. To this end, digitized copyrighted subject matter can embed code that provides proof of ownership and copy protection.

Published articles reflect the industry's awareness that systems can be deployed to detect when alterations to copyrighted subject matter are made, track the movement of content through serial numbers and meter contents so that the appropriate royalties can be paid to the information provider. One system described in the prior art comprises a constellation of software and content vending machines on the Internet. On-line subscription is unnecessary. Rather, the user requests the information directly from the vending machine on the Internet, pays for the information on the spot and then takes the information, e.g., a newspaper, a magazine, etc.

The present invention takes a different approach that can be implemented in several ways. One approach interposes the "local" monitoring software of the present invention (or a similar system) between the Internet and the user. The "local" monitoring software then receives, monitors, tags, and quantifies the usage, e.g., downloading, using, etc. of copyrighted subject matter. That software then prepares local reports reflecting the usage, which reports are then collated by the central site computer of the present invention, to provide reports to the vendors/owners of the copyrighted subject matter usage for billing purposes.

Another approach uses the local computers to detect whether information that is being accessed or used is copyrighted, i.e. proprietary, without regard to how that information got there, whether through the Internet or other means. In either case, the accessing of, or usage of, the copyrighted subject matter is monitored and quantified in much the same, if not identical way, to the manner in which such "events" as the accessing and usage of traditional software products have been described above. Therefore, in the terminology of the present invention, an "event" includes the usage of copyright subject matter. Therefore, the term "proprietary product" as used in the present application encompasses more than software products or databases, insofar as it also includes other proprietary products, such as copyrighted text, graphics, database compilations, etc.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Apparatus for proprietary product usage verification and reporting at plural, discrete computer sites, the apparatus comprising:
  a central computer for communicating with the plural discrete computer sites which are remote to the central computer;
  each computer site including:
    a. a memory and at least one proprietary product stored in the memory;
    b. a monitoring program that monitors usage of the at least one proprietary product at the discrete computer sites; and
    c. a reporting program that transmits, to said central computer, a local report which quantifies the usage of the at least one proprietary product at the discrete computer site;
  said central computer including:
    a correlating program which receives the local reports from the plural discrete computer sites and collates and orders information in the local reports into data packets formed on the basis of vendors of the at least one proprietary product; and
    a central reporting program for communicating with vendors and reporting to vendors usage of proprietary products at the plural discrete computer sites which are licensed by the vendors.

2. The apparatus of claim 1, in which the central computer includes a software facility for prompting the local reports to issue from the discrete computer sites, in response to prompting commands from the central computer to the discrete computer sites.

3. The apparatus of claim 1, in which the central computer includes an authorization facility for transmitting vendor originated authorization codes to the discrete computer sites.

4. The apparatus of claim 1, in which the central computer includes an authorization facility which receives authorization related data from the plural discrete computer sites.

5. The apparatus of claim 1, in which the central computer includes a software facility for preparing and transmitting to the discrete computer sites software usage billings.

6. The apparatus of claim 1, in which the central computer includes a software facility for controlling and monitoring collection of monies due for use of the proprietary products at the discrete computer sites.

7. The apparatus of claim 1, in which the central computer includes a software facility for calculating amounts of royalties owed for the use of the proprietary products at the discrete computer sites.

8. The apparatus of claim 1, in which the central computer includes a software facility for controlling disbursements to the vendors of monies received on account of the discrete computer sites.

9. The apparatus of claim 1, in which the central computer comprises a software facility for posting notices at the various computer sites.

10. The apparatus of claim 1 in which each computer site also includes a surveying program that surveys the memory and stores a list of software products in the memory.

11. The apparatus of claim 1, in which the at least one proprietary product comprises at least one software product stored in the memory.

12. The apparatus of claim 1, in which the at least one proprietary product comprises at least one copyrighted work.

13. The apparatus of claim 1, including a software facility for monitoring compliance with license terms at the discrete computer sites.

14. The apparatus of the previous claim 13, in which the software facility includes means for carrying out random checks of the memory at the discrete computer sites to verify license compliance.

15. Method for proprietary product usage verification and reporting at plural, discrete computer sites, the method comprising:
   providing a central computer for communicating with the plural discrete computer sites which are remote to the central computer;
   providing at each computer site:
      a. a memory and at least one proprietary product stored in the memory;
      b. a monitoring program that monitors invocations of the at least one proprietary product at the discrete computer sites; and
      c. a reporting program that transmits, to said central computer, a local report which quantifies the usage of the at least one proprietary product at the discrete computer site;
   correlating, at the central computer, the local reports received from the plural discrete computer sites and collating and ordering information contained in the local reports into data packets formed on the basis of vendors of the at least one proprietary product; and
   forming, at the central computer, a central report which communicates to the vendors and reports usage of proprietary products at the plural discrete computer site which are licensed by the vendors.

16. The method of claim 15, including prompting the local reports to issue from the discrete computer sites, in response to prompting commands from the central computer to the discrete computer sites.

17. The method of claim 15, including transmitting vendor originated authorization codes to the discrete computer sites.

18. The method of claim 15, including receiving authorization data from the plural discrete computer sites.

19. The method of claim 15, including preparing and transmitting to the discrete computer sites software usage billings.

20. The method of claim 15, including controlling and monitoring collection of monies due for use of the proprietary products at the discrete computer sites.

21. The method of claim 15, including calculating amounts of royalties owed for use of the proprietary products at the discrete computer sites.

22. The method of claim 15, including controlling, at the central computer, disbursements to the vendors of monies received on account of the discrete computer sites.

23. The method of claim 15, including posting notices at the various, discrete computer sites, via the central computer.

24. The method of claim 15, including a surveying program that surveys the memory and stores a list of software products in the memory.

25. The method of claim 15, including providing a debit card facility at the plural computer sites which contain the predetermined credit balance against which license fees can be charged.

26. The method of claim 15, in which the usage includes an event comprising the installation of at least one proprietary product.

27. The method of claim 15, in which the at least one proprietary product comprises at least one software product stored in the memory.

28. The method of claim 15, in which the at least one proprietary product comprises at least one copyrighted work.

29. The method of claim 15, including monitoring compliance with license terms at the discrete computer site, via the central computer.

30. The method of claim 29, in which monitoring compliance with license terms includes carrying out random checks of the memory at the discrete computer sites to verify license compliance.

31. Apparatus for software license verification at plural, discrete computer sites, the apparatus comprising:
   a central computer for communicating with the plural, discrete computer sites which are remote to the central computer;
   each computer site including at least one storage device and further including:
      a. memory means having both a list of program module names of program modules and for each of said program module names a product name associated therewith stored therein;
      b. surveying means that surveys the storage devices and stores in said memory means module names of modules stored on said at least one storage device;
      c. associating means that stores in said memory means an association between the product names stored in said memory means and each of said module names stored in said memory means;
      d. monitoring means that monitors invocations of said modules on said computer and stores in said memory means invocation data relating to said invocations of said modules;
      e. correlating means that correlates said invocation data stored in said memory means and said association between the product names and each of said module names stored in said memory means; and
      f. reporting means that transmits, to said central computer, the data correlated by said correlating means;

said central computer including:
a correlating program which receives local reports from the plural discrete computer sites and collates and orders information in the local reports into data packets formed on the basis of vendors of the at least one software product; and
a central reporting program for communicating with vendors and reporting to vendors usage of software products at the plural discrete computer sites which are licensed by the vendors.

32. Apparatus for software license verification at plural, discrete computer sites, the apparatus comprising:
a central computer for communicating with the plural, discrete computer sites which are remote to the central computer;
each computer site including:
means for reporting events on a computer system relating to a product, the product being associated with at least one module, said means comprising:
a. memory means;
b. means for detecting an event relating to a module, said detecting means detecting said event other than by indication from said module;
c. means for obtaining event information relating to said event;
d. means for recording said event information in said memory means;
e. means for correlating said event information stored in said memory means and the product associated with said event;
f. means for transmitting, to said central computer, said correlated data;
said central computer including:
a correlating program which receives local reports from the plural discrete computer sites and collates and orders information in the local reports into data packets formed on the basis of vendors of the at least one software product; and
a central reporting program for communicating with vendors and reporting to vendors usage of software products at the plural discrete computer sites which are licensed by the vendors.

33. Apparatus as claimed in claim 32, wherein said detecting means detects every event relating to said module.

34. Apparatus as claimed in claim 32, wherein said event being detected is an invocation of said module.

35. Apparatus as claimed in claim 32, wherein said event being detected is one of a plurality of events including an invocation of said module.

36. Apparatus as claimed in claim 32, wherein said event being detected is a termination of said module.

37. Apparatus as claimed in claim 32, wherein said event being detected is one of a plurality of events including at least one of an invocation and a termination of said module.

38. Apparatus as claimed in claim 32, wherein said event being detected is a service request.

39. Apparatus as claimed in claim 32, wherein said event being detected is one of a plurality of events including a service request.

40. Apparatus as claimed in claim 32, wherein said detecting means detects said event using a set of additional instructions inserted into an existing program other than said at least one module or into an operating system.

41. Apparatus as claimed in claim 32, wherein said detecting means detects said event using hooked vectors.

42. Apparatus as claimed in claim 32, wherein said event information includes the name of at least one of:
a name associated with said module,
a volume associated with said module,
a computer system associated with said event,
a user associated with said event,
a job associated with said event,
a library from which said module was obtained, and
an area of main storage from which said module was obtained.

43. Method for software license verification at plural, discrete computer sites, the method comprising:
providing a central computer for communicating with the plural discrete computer sites which are remote to the central computer;
each computer site having at least one storage device and performing the steps of:
a. storing a list of program module names of program modules and for each of said program module names storing a product name associated therewith;
b. surveying said at least one storage device and storing module names of modules stored on said at least one storage device;
c. storing an association between said stored product names and each of said stored module names;
d. monitoring invocations of said modules on said computer and storing invocation data relating to said invocations of said modules;
e. correlating said invocation data and said association between the stored product names and each of said stored module names; and
f. transmitting, to said central computer, the correlation of said invocation data and said association between said stored product names and each of said stored module names;
correlating, at the central computer, local reports received from the plural discrete computer sites and collating and ordering information contained in the local reports into data packets formed on the basis of vendors of the at least one software product; and
forming, at the central computer, a central report which communicates to the vendors and reports usage of software products at the plural discrete computer site which are licensed by the vendors.

44. Method for software license verification at plural, discrete computer sites, the method comprising:
providing a central computer for communicating with the plural discrete computer sites which are remote to the central computer;
each computer site being related to a product, the product being associated with at least one module, the computer site performing the steps of:
a. detecting an event relating to a module, said step of detecting being carried out other than by indication from said module;
b. obtaining event information relating to said event;
c. recording said event information in a memory means;
d. correlating said event information stored in said memory means and the product associated with said event; and
e. transmitting, to said central computer, said correlated data; and
correlating, at the central computer, the local reports received from the plural discrete computer sites and collating and ordering information contained in the local reports into data packets formed on the basis of vendors of the at least one software product; and forming, at the central computer, a central report which communicates to the vendors and reports usage of software products at the plural discrete computer site which are licensed by the vendors.

45. Method as claimed in claim 44, wherein said detecting step detects every event relating to said module.

46. Method as claimed in claim 44, wherein said event being detected is an invocation of said module.

47. Method as claimed in claim 44, wherein said event being detected is one of a plurality of events including an invocation of said module.

48. Method as claimed in claim 44, wherein said event being detected is a termination of said module.

49. Method as claimed in claim 44, wherein said event being detected is one of a plurality of events including at least one of an invocation and a termination of said module.

50. Method as claimed in claim 44, wherein said event being detected is a service request.

51. Method as claimed in claim 44, wherein said event being detected is one of a plurality of events including a service request.

52. Method as claimed in claim 44, wherein said detecting step detects every event relating to said module.

53. Method as claimed in claim 44, wherein said detecting step detects said event using a set of additional instructions inserted into an existing program other than said at least one module or into an operating system.

54. Method as claimed in claim 44, wherein said detecting step detects said event using hooked vectors.

55. Method as claimed in claim 44, wherein said event information includes the name of at least one of:
   a name associated with said module,
   a volume associated with said module,
   a computer system associated with said event,
   a user associated with said event,
   a job associated with said event,
   a library from which said module was obtained, and
   an area of main storage from which said module was obtained.

56. Method as claimed in claim 44, wherein said event information includes at least one of:
   a time associated with the initiation of the event,
   a date associated with the initiation of the event.

57. Apparatus for software license verification at plural, discrete computer sites, the apparatus comprising:
   a central computer for communicating with the plural discrete computer sites which are remote to the central computer;
   each computer site including:
      a. a memory and at least one software product stored in the memory;
      b. a monitoring program that monitors invocations of the software products at the discrete computer sites; and
      c. a reporting program that transmits, to said central computer, a local report which quantifies the usage of the at least one software product at the discrete computer site;
   said central computer including:
      a correlating program which receives the local reports from the plural discrete computer sites and collates and orders information in the local reports into data packets formed on the basis of vendors of the at least one software product; and
      a central reporting program for communicating with vendors and reporting to vendors usage of software products at the plural discrete computer sites which are licensed by the vendors.

58. Method for software license verification at plural, discrete computer sites, the method comprising:
   providing a central computer for communicating with the plural discrete computer sites which are remote to the central computer;
   providing at each computer site:
      a. a memory and at least one software product stored in the memory;
      b. a monitoring program that monitors invocations of the software products at the discrete computer sites; and
      c. a reporting program that transmits, to said central computer, a local report which quantifies the usage of the at least one software product at the discrete computer site;
   correlating, at the central computer, the local reports received from the plural discrete computer sites and collating and ordering information contained in the local reports into data packets formed on the basis of vendors of the at least one software product; and
   forming, at the central computer, a central report which communicates to the vendors and reports usage of software products at the plural discrete computer site which are licensed by the vendors.

\* \* \* \* \*